United States Patent [19]

Skerlos

[11] Patent Number: 4,461,032
[45] Date of Patent: Jul. 17, 1984

[54] CATV SERVICE CONTROLLER

[75] Inventor: Peter C. Skerlos, Arlington Heights, Ill.

[73] Assignee: Zenith Radio Corporation, Glenview, Ill.

[21] Appl. No.: 390,092

[22] Filed: Jun. 21, 1982

[51] Int. Cl.³ .......................... H04B 3/06; H04N 7/16
[52] U.S. Cl. ......................................... 455/4; 358/86; 358/122
[58] Field of Search ............................. 455/1, 3, 4, 26; 358/114, 122, 86, 117; 340/825.07

[56] References Cited

U.S. PATENT DOCUMENTS

| | | | |
|---|---|---|---|
| 3,423,521 | 1/1969 | Friesen et al. | 358/86 |
| 3,934,079 | 1/1976 | Barnhart | 455/4 |
| 4,039,954 | 8/1977 | Toonder | 455/1 |
| 4,118,669 | 10/1978 | Fung | 455/4 |
| 4,222,066 | 9/1980 | Zelenz | 358/86 |
| 4,222,068 | 9/1980 | Thompson | 358/120 |
| 4,349,795 | 9/1982 | Kwok | 358/86 |

Primary Examiner—Marc E. Bookbinder

[57] ABSTRACT

A remotely located and controlled programming controller for a cable-compatible television receiver is disclosed. Cable head end-generated control signals are provided by wire to the cable TV controller for selectively enabling the reception of subscribed-to CATV channels by the television receiver. Coded subscriber addressing and operating mode control signals are provided to each controller in the cable network for selectively enabling/disabling each controller for limiting cable programming distribution. Each controller is responsive to transmitted operating mode control data bits for enabling/disabling individual cable channel reception. In addition, each controller is assigned and responsive to subsequently transmitted, uniquely coded address identifier data bits. Operating mode control and address data are represented respectively by the first and last bit groups of the head end-generated cable access signal. The programming controller may be remotely located in coupling the television receiver to the cable network with system status monitoring provided by head end-generated probe signals for enhanced programming security.

8 Claims, 3 Drawing Figures

CATV SERVICE CONTROLLER

BACKGROUND OF THE INVENTION

This invention relates generally to cable television (CATV) systems and more particularly is directed to a controller for selectively providing designated cable television channels to a television receiver.

An increasing area of contention exists between television receiver manufacturers and cable television station operators. Differences between these two factions are primarily due to the ever-increasing number of cable television stations available and the increasingly greater variety and substantial improvement in cable television programming. On the one hand, the television receiver manufacturer would like to incorporate a tuning system in the television receiver which is fully compatible with as many cable stations as possible without requiring an intervening signal converter. On the other hand, the cable operator seeks to selectively limit the distribution of cable signals on a subscription, or contractual, basis. The cable operator generally limits cable signal distribution by selectively coupling into the cable system only those viewers who have subscribed for the service. Earlier cable distribution systems required the cable operator to install a drop cable between the television receiver and a passive device called a "tape" connected to the cable passing the subscriber's residence.

U.S. Pat. No. 4,118,669 to Fung discloses a remotely controlled disconnect-reconnect tap for a cable television system wherein the tap receives and is responsive to a plurality of pairs of modulated tones propagated over the cable distribution system from the head end for generating a control signal and further includes a switch means responsive to the control signal which turns off if already on or on if already off to thereby disconnect or reconnect, respectively, a subscriber to the cable distribution system. This approach to selectively limiting the distribution of cable television signals has inherent limitations. Generally, the cable television box located on or near the subscriber's property is not completely secure against subscriber access to the contents thereof. Thus, one limitation in such systems relates to the fact that the customer himself may reconnect his television receiver to the distribution cable without the authorization of the cable operator. This may be accomplished by either physically reconnecting the "drop" cable to the distribution cable, or by electronically switching a passive "tap" device so as to reconnect the "drop" cable to the distribution cable. In addition, the cable operator may be unaware of such unauthorized tampering and generally has no means for detecting such activity.

Another measure for preventing the unauthorized utilization of a transmitted signal involves the encoding and decoding of the signal. This approach generally renders the video picture unviewable by upsetting the horizontal synchronization of the television receiver. This is most simply accomplished by removing the horizontal synchronization pulses or suppressing them below the average video level of the transmitted signal. This results in the television receiver attempting to lock horizontally onto random video peaks transmitted during the active scan portions of the video signal rather than on the actual horizontal synchronization pulses. The television receiver is thus unable to use a color reference burst associated with the horizontal synchronization signals resulting in inaccurate color image reproduction. This approach suffers from the disadvantage of requiring transmission of an encoding signal to reconstruct the missing or suppressed horizontal synchronization pulses.

Another popular approach for transmitted signal scrambling employs circuitry to invert all or selected portions of the video signal to prevent unauthorized demodulation of video signal content. Some such systems randomly invert fields or individual lines of video to establish a scrambled signal. Unfortunately, this general approach involves an inefficient process of generating, communicating, and decoding some form of encoding signal in addition to the scrambled video signal. An example of this approach particularly adapted for subscription television systems is disclosed in U.S. Pat. No. 4,222,068 to Thompson.

The present invention is intended to overcome the aforementioned limitations of the prior art by providing a tamper-proof, head end controlled cable television programming controller which not only provides for selective access to the cable television network, but also is capable of remotely controlling the selective transmission of individual cable channels to system subscribers.

OBJECTS OF THE INVENTION

Accordingly, it is an object of the present invention to provide a more secure means for controlling the selective distribution of cable television programming.

It is another object of the present invention to provide a remotely controlled system for the selective distribution of cable television signals which is tamper-proof and does not employ an expensive signal scrambler/descrambler.

It is a further object of the present invention to provide a cable television controller which permits the selective distribution of predetermined cable programming to a television receiver capable of directly receiving all cable channels.

Still another object of the present invention is to provide a microprocessor controlled cable television signal distribution system wherein complete control is exercisable instantaneously at the head end of the cable system with no degradation of the received cable television signal visible to the viewer.

BRIEF DESCRIPTION OF THE DRAWINGS

The appended claims set forth those novel features believed characteristic of the invention. However, the invention itself as well as further objects and advantages thereof will best be understood by reference to the following detailed description of a preferred embodiment taken in conjunction with the accompanying drawings, where like reference characters identify like elements throughout the various figures, in which:

DESCRIPTION OF PREFERRED EMBODIMENTS

Figure 1:
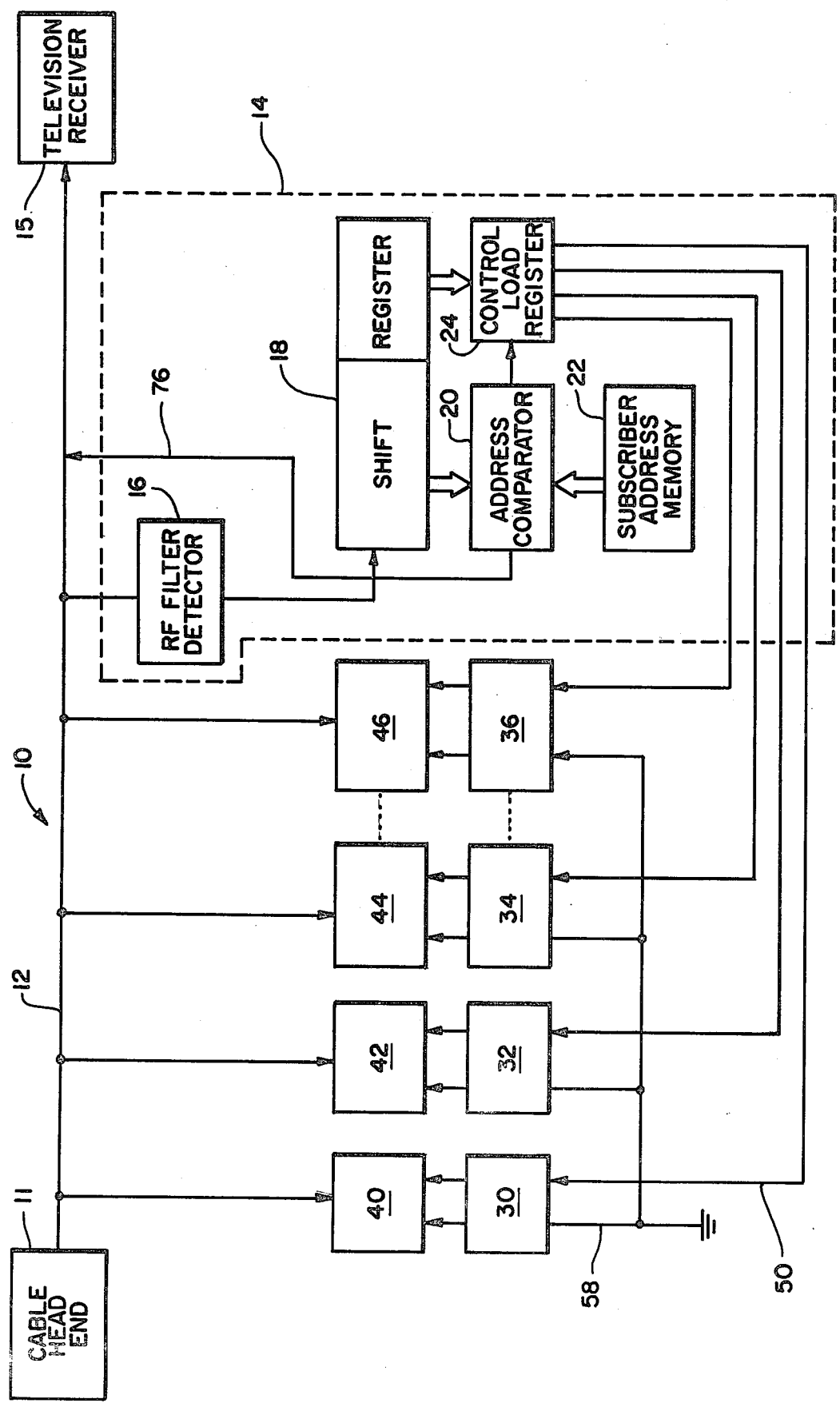
FIG. 1 is a block diagram of a cable television service controller incorporating the teachings of the present invention.

Referring to FIG. 1, there is shown in general block diagram form a cable television service controller 10 in accordance with the present invention.

A cable television signal distribution system includes a head end portion 11 from which control and programming signals are provided to the television receiver 15 of a cable service subscriber. Although FIG. 1 shows only a single television receiver 15 included in the cable television distribution network which for illustrative purposes is shown simply as a single cable 12, it is to be understood that the present invention contemplates the distribution of the cable television signal to a large number of television receivers, each having associated therewith a respective cable television service controller 10 in accordance with the present invention. The cable television service controller 10 is preferably positioned along the cable system between its associated television receiver 15 and the cable head end 11. Typically, the cable television service controller would be connected to a "drop" cable which couples the distribution cable passing the residence of a subscriber and the subscriber's television receiver. Thus, as shown in FIG. 1, cable 12 would typically be a "drop" cable in a cable television distribution system. As such, the cable television service controller of the present invention would typically be located outside of the subscriber's residence, but on or near his property, either above the ground on a utility post or in a surfce service box. Since all cable television service controllers would be essentially identical as contemplated by the present invention, a description of one controller will satisfy in describing the complete cable distribution system made possible by the present invention.

The cable head end-controller envisioned for use in the present invention may be conventional in design and operation and typically would include a central computer (not shown) connected to an electronic keyboard or typewriter (also not shown) to provide information such as the subscriber's address code, the cable programming which the subscriber desires to receive, and the period of service for which the subscriber has paid. The keyboard also provides a means for loading instructions to the computer at the discretion of the cable operator. Periodically, the computer would scan all of the subscriber locations and automatically terminate cable channel access in a manner to be described of those who have not kept their payments up-to-date as determined by information previously stored in the computer. When payment is received the computer would initiate the proper control signals at the cable head end for reconnecting the subscriber. In addition, the computer would initiate the transmission of probe signals on the cable for monitoring the status of the CATV service controller in the system in order to indicate to the cable operator whether the service controller had been tampered with, removed, or if any other unauthorized activity with respect to the cable distribution system had taken place. Central computer control of a CATV distribution system is well known in the art, does not form a part of the present invention, and therefore will not be further discussed herein.

In the following description, numerous well-known components are shown in block diagram form in order not to obscure the described inventive concepts in unnecessary detail. In other instances, specific details are provided in order that these inventive concepts may be clearly understood. It will be apparent to those skilled in the art that the described inventive concepts may be employed without use of these specific details and that the scope of the present invention is not limited by their disclosure.

The cable television service controller 10 includes a control/address circuit 14 coupled to the cable 12 for receiving address and operating mode control signals from the cable head end 11. The address and operating mode control signals may be modulated on an RF carrier having a frequency preferably between adjacent cable channels, e.g., between channels 4 and 5. Alternatively, the address and operating mode control signals may be transmitted during the vertical interval of the cable television signal by means well known in the art. For example, the aforementioned U.S. Pat. No. 4,222,068 discloses encoder means for inserting data signals into selected trace lines of the vertical interval and decoder means responsive to these data signals and selectively enabled or disabled thereby.

The front end of the control/address circuit 14 includes an RF filter/detector circuit 16 to which the address and operating mode signals are provided from the cable 12. The RF filter/detector circuit 16 may be conventional in design, including a suitable combination of reactive inductive (L) and capacitive (C) elements forming a high-Q resonant circuit tuned to the frequency of the aforementioned address and operating mode control signal.

The address and operating mode control signals are digital in form and comprised of a plurality of serial arrangements of pulse code modulated (PCM), pulse width modulated (PWM), or any other conventional pulse coding scheme typically utilized for the transmission of data. These filtered and detected digital signals are then serially provided to a shift register 18. Each combination of address and operating mode control signals includes a plurality of bits with a first group of bits comprising the operating mode control signal and a second group of bits comprising the address signal. Thus, the operating mode control signal is serially loaded into the shift register 18 and stored in the right hand portion thereof, with the address signal subsequently loaded into the shift register 18 in a serial fashion and stored in the left hand portion thereof. The contents of the left hand portion of the shift register 18 are applied in a parallel manner to an address comparator 20. The address contents of shift register 18 are then compared with the stored contents of the subscriber address memory 22 in the address comparator 20 resulting in a load signal being provided by address comparator 20 to a control load register 24 if the respective addresses provided to the address comparator are identical. If different address information is provided by the shift register 18 and the subscriber address memory 22 to the address comparator 20, the address comparator 20 does not provide a load signal to the control load register 24.

Stored in the subscriber address memory 22 and read therefrom and provided to the address comparator 20 is a multi-bit code which identifies an individual subscirber. This code is unique to an individual subscriber and is stored in the subscriber address memory 22 prior to subscriber hook-up to the cable television distribution system. The subscriber address memory 22 may be a conventional EAROM (electrically alterable read only memory), the operation of which is based upon the hysteresis characteristics of threshold values of an MNOS (metal-nitride-oxide-silicon) transistor. Non-volatile memories of this type are well known in the art and are capable of storing large amounts of data which may be read therefrom for use in the system in which it is employed. The subscriber address memory 22 contains subscriber address information which provides information which uniquely identifies a particular cable television network subscriber. In an EAROM utilized as the subscriber address memory 22, a stored charge therein indicates a binary "1", while the absence of a charge indicates a "0". The subscriber address memory 22 is non-volatile and the stored charge will remain for many years therein. The size of the subscriber address memory is preferably large enough to accommodate a large number of CATV subscribers with a particular address assigned to each subscriber. Multi-kilobit memories are typically available in conventional EAROM's which will accommodate a large number of CATV subscribers.

As previously explained, operating mode and address data are sequentially loaded into shift register 18. The data is in the form of a predetermined number of bits of digital information with an initial group of bits representing operating mode control information and a trailing group of data bits provided to shift register 18 representing subscriber address information. The exact number of bits involved will depend upon the number of subscriber addresses required, the number of CATV channels available, and the specific components used in the present invention. Because the number of CATV subscribers will be much larger than the number of available CATV channels, the number of bits representing address data will be greater than the number of bits representing operating mode data.

With address data preset into the subscriber address memory 22, this stored address information is compared with the received address information provided to shift register 18 in address comparator 20. When the address data preset into address memory 22 matches the address data which is loaded into shift register 18, the operating mode control bits loaded into shift register 18 are provided to and processed in control load register 24 in response to an actuation signal provided thereto by address comparator 20. Operating mode data is provided in parallel to the control load register 24 which, in turn, provides a plurality of parallel outputs to electronic switches 30, 32, 34 and 36. In one embodiment of the present invention, each operating mode control bit provided to control load register 24 by shift register 18 controls a corresponding output port of control load register 24 and, in turn, a respective one of the aforementioned electronic switches.

Control load register 24 may be any conventional parallel in/parallel out shift register responsive to a control input provided thereto by address comparator 20. Thus, data is shifted into and out from control load register 24 in response to the comparison of stored and received subscriber address data in address comparator 20. Address comparator 20 may be a conventional microprocessor or a plurality of discrete logic gates capable of receiving and comparing two digital inputs provided thereto and outputting a control signal in response to this comparison of digital input signals. Thus, any conventional microprocessor and parallel in/parallel out shift register could be utilized for the address comparator 20 and control load register 24, respectively, of the present invention. Because the specific operation and configuration of these components does not form a part of the present invention, this aspect of the CATV service controller will not be discussed further herein.

As shown in FIG. 1, control load register 24 provides a plurality of parallel outputs to electronic switches 30, 32, 34 and 36. For illustrative purposes, only four electronic switches are shown in FIG. 1, although the present invention is not limited to this number and will operate equally well with any desired number of electronic switches provided each is coupled to a respective output pin of control load register 24. Electronic switches 30, 32, 34 and 36 are respectively coupled to and control the operation of CATV channel filters 40, 42, 44 and 46. The operating state of each channel filter is controlled by the inputs provided thereto by a respective electronic switch such that when a particular channel filter is actuated by the output of an electronic switch coupled thereto, that portion of the cable signal at the frequency to which the channel filter is tuned will be directed to neutral ground potential via the actuated channel filter ane electronic switch coupled thereto. In this manner, individual CATV channels operating at specific frequencies may be selectively decoupled from the subscriber's television receiver 15 in accordance with the operating mode control signals provided by the control load register 24 to the corresponding electronic switch and channel filter combination.

Figure 2:
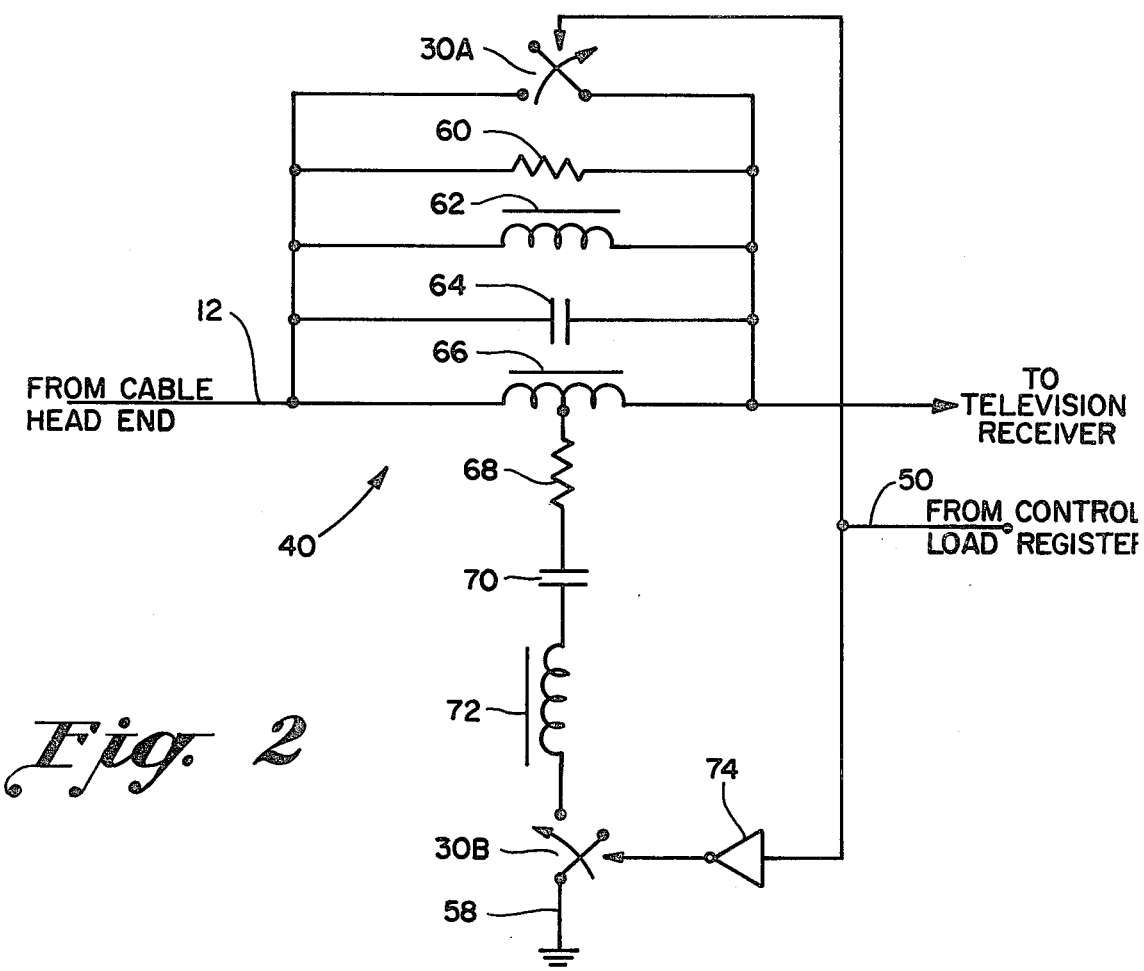
FIG. 2 is a schematic diagram of one example of a compensated trap circuit utilized in a preferred embodiment of the present invention.

More specifically, referring to FIG. 2 there is shown the combination of an electronic switch and a CATV channel filter 40. The electronic switch is comprised of switch elements 30A, 30B which are coupled to the control load register (not shown in FIG. 2) via line 50. Connected between the control load register and switch element 30B is an inverter 74 such that switch elements 30A and 30B will assume opposite operating states. For example, when switch element 30A is closed, switch element 30B will be open, and vice versa. While switch elements 30A, 30B are shown simply as mechanical switches, this is for illustrative purposes only and in a preferred embodiment switch elements 30A, 30B assume the form of electronic switches such as provided by a conventional switching diode circuit. Since switching diode circuits are conventional in nature and do not form a part of the present invention, the specific configuration of the electronic switches utilized in the present invention will not be discussed further herein.

The channel filter, or trap, circuit 40 shown in FIG. 2 and utilized in a preferred embodiment of the present invention is comprised of a constant resistance bridged-T null notch filter capable of absorbing the total energy of the rejected signal in its resistive arms, i.e., no energy is transmitted beyond the filter and virtually no energy is reflected back, while offering essentially no insertion loss over the pass band. Each notch, or compensated trap, filter is turned to the picture carrier of a respective CATV channel frequency by appropriate selection of filter component values in order to permit the selective accessing of these CATV channels by the subscriber's television receiver. When switch element 30A is closed in response to an appropriate operating mode control signal received via line 50 from control load register 24, switch element 30B will be open by virtue of the presence of inverter 74 in the circuit. With switch element 30A closed, the entire CATV signal will be transmitted from the cable head end via cable 12 to the subscriber's television receiver. When switch element 30B is closed by virtue of an appropriate operating mode control signal provided via line 50 from control load register 24, the series resonant circuit comprised of resistor 68, capacitor 70 and inductor 72 is coupled to neutral ground potential via line 58. With switch element 30A open when switch element 30B is closed, the cable television signal transmitted along cable 12 will be subject to the filtering action of the T filter comprised of resistor 60, inductor 62 and capacitor 64 in parallel and the serial configuration of resistor 68, capacitor 70 and inductor 72. These tuned circuit elements are coupled by means of a hybrid transformer 66 and the respective values of these various circuit components are such as to result in the filtering out of a predetermined CATV channel frequency by coupling this signal component of neutral ground potential. In this manner, the actuation of a respective CATV channel filter 40, 42, 44 or 46 by a respective electronic switch 30, 32, 34 or 36 coupled thereto will result in the effective elimination of the CATV channel frequency to which that filter is tuned.

Figure 3:
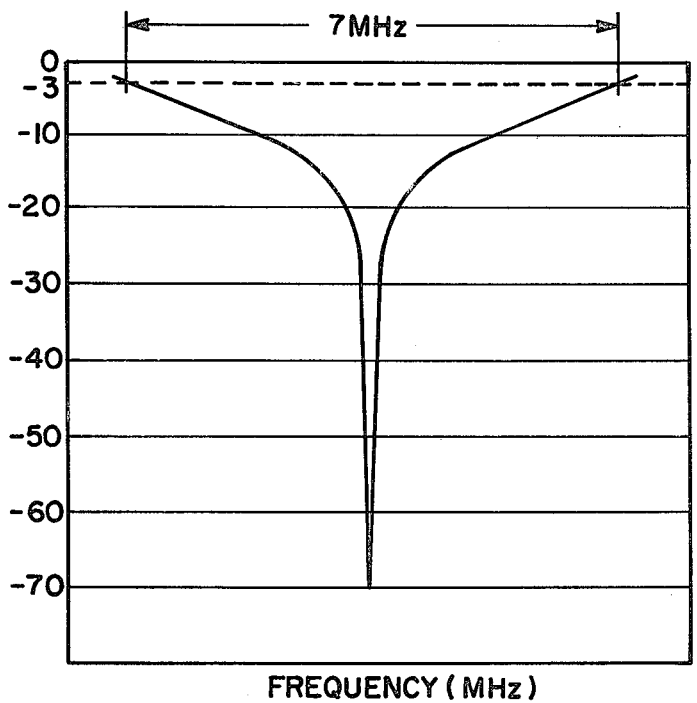
FIG. 3 shows a typical frequency response curve for a compensated trap circuit as shown in FIG. 3.

Referring to FIG. 3, there is shown a representative amplitude response for a bridged-T filter as shown in FIG. 2. It can be seen that this type of trap filter is capable of effectively eliminating a very narrow bandwidth, or a notch frequency, from a transmitted signal. While the present invention has been disclosed in terms of the use of a bridged-T filter, the concept of the present invention is equally compatible with any conventional signal filter. For example, a surface wave integrated filter (SWIF) could be employed in the present invention as a CATV channel filter as previously described. Similarly, a "cable trap" could be utilized in the present invention. These well known cables include a balanced 75 ohm coaxial cable having a pair of center conductors. One of these two parallel center conductors runs from the input to the output of the line section while the second center conductor is broken into four discrete segments. Each of these four sections is grounded to a double shield surrounding the pair of center conductors with the double shield coupled directly to neutral ground potential.

From the immediately preceding discussion it can be seen that the programming available to a subscriber will remain unchanged until his coded address signal is transmitted on the cable system accompanied by a new set of operating mode control signals. However, in the intervals between the updating of operating mode control information the present invention envisions the transmission of probe signals via the cable to system subscribers for monitoring the status of individual CATV service controllers. This could be accomplished simply by transmitting a coded signal via cable 12 to the service controller 10, passing the signal through the control/address circuit 14 of the service controller, and returning the thus processed signal via line 76 to the cable 12 for transmission back to the cable head end 11. This process could be accomplished using conventional techniques such as by employing two cables for carrying signals in opposite directions or by implementing this controller status check routine during the vertical interval of the video signal. The cable head end computer would transmit a coded signal to the controller's control/address circuit 14 which would be programmed to process this predetermined, coded signal and output a particular bit code in response thereto. The cable head end would receive the response of the controller's control/address circuit 14, compare this output with a stored bit code, and provide the cable operator with an indication as to the status of the remotely located CATV service controller. There are numerous ways in which such a feature could be implemented and since the basic approach is well known in the art, it will not be further discussed herein. Finally, the CATV service controller 10 would be energized by a low voltage DC source at the cable head end 11 by means of a line running along the cable distribution route. Since the CATV service controller as envisioned by the present invention employs low power integrated circuits and discrete semiconductor devices, a low voltage DC supply could be utilized in the present invention.

There has thus been shown a cable television service controller for selectively limiting the distribution of CATV signals by means of remote control. The controller of the present invention not only permits individual subscribers to be connected/disconnected from the CATV system, but also allows for the selective distribution of individual CATV channels to individual subscribers by remote control from the cable head end.

While particular embodiments of the present invention have been shown and described, it will be apparent to those skilled in the art that changes and modifications may be made therein without departing from the invention in its broader aspects. The aim in the appended claims, therefore, is to cover all such changes and modifications as fall within the true spirit and scope of the invention.

I claim:

1. In a remotely controlled cable television distribution system having a cable and a head end wherein are generated addressing and operating mode control signals for providing for the selective transmission of programming signals to a plurality of subscribers in said cable distribution system, wherein said addressing signals provide for the selective accessing of individual subscriber television receivers by said head end and said operating mode control signals provide for the selective distribution of said programming signals representing a plurality of cable television channels to said plurality of subscribers, a cable television service controller remotely located from a respective subscriber television receiver to which it is coupled, said service controller comprising:

programmable memory means for storing an address code representing an individual subscriber coupled to said cable television distribution system;

comparator means coupled to said cable and said programmable memory means for comparing an addressing signal from said cable head end and said stored address code for generating an actuation signal when said addressing signal and said stored address code correspond; and control means coupled to said cable and said comparator means and responsive to said actuation signal for selectively providing said programming signals representing said plurality of cable television channels to the subscriber coupled thereto in accordance with said operating mode control signals following receipt of an addressing signal representing said subscriber, said control means including a plurality of RF electronic switch and signal filter combinations, wherein each of said signal filters includes a plurality of passive components in combination, with each component combination tuned to a predetermined frequency corresponding to the frequency of a respective cable television channel, with the respective electronic switch coupled thereto connected to neutral ground potential for selectively grounding a programming signal provided thereto.

2. A cable television controller as in claim 1 wherein each of said signal filters includes a passive bridged-T filter.

3. A cable television service controller as in claim 1 wherein said programmable memory means includes a read only memory and said comparator means includes a microprocessor for comparing said stored address code with said address signal and generating said actuation signal in response to said comparison.

4. A cable television service controller as in claim 1 wherein said controller is energized by a low level DC voltage provided by said cable head end.

5. A cable television service controller as in claim 1 wherein said address and operating mode control signals are modulated on an RF carrier frequency located between adjacent cable programming singal frequencies.

6. A cable television service controller as in claim 1 wherein said control means includes a plurality of electronic switch and two-terminal notch filter combinations each coupled in parallel to said cable, with each notch filter exhibiting a sharp frequency rejection characteristic of a desired, relatively high attenuation level at the frequency of one of said programming signals whereby an electronic switch is rendered conductive in response to receipt of an actuation signal for rendering a respective notch filter conductive and grounding a respective programming signal.

7. In a remotely controlled cable television distribution system having a cable and a head end wherein are generated addressing and operating mode control signals for providing for the selective transmission of programming signals to a plurality of subscribers in said cable distribution system, wherein said addressing signals provide for the selective accessing of individual subscriber television receivers by said head end and said operating mode control signals provide for the selective distribution of said programming signals representing a plurality of cable television channels to said plurality of subscribers, a cable television service controller remotely located from a respective subscriber television receiver to which it is coupled, said service controller comprising:

programming memory means for storing an address code repesenting an individual subscriber coupled to said cable television distribution system;

comparator means coupled to said cable and said programmable memory means for comparing an addressing signal from said cable head end and said stored address code for generating an actuation signal when said addressing signal and said store address code correspond; and control means coupled to said cable and said comparator means and responsive to said actuation signal for selectively providing said programming signals representing said plurality of cable television channels to the subscriber coupled thereto in accordance with said operating mode control signals following receipt of an addressing signal representing said subscriber;

wherein said service controller is responsive to a probe signal provided thereto by said cable head end for monitoring the status of said service controller and for providing the cable head end with a status signal representing the operating mode of said service controller.

8. A method of selectively distributing a plurality of cable television channel frequencies to a plurality of service controllers coupled to a cable distribution network, said method comprising the steps of:

transmitting a first group of data bits representing selective ones of said plurality of cable television channel frequencies on said cable distribution network from a head end thereof;

transmitting a second group of data bits representing an individual service controller on said cable distribution network from said head end;

comparing said second group of data bits with an address code uniquely representing said individual service controller;

filtering out selective ones of said plurality of cable television channel frequencies in accordance with said first group of data bits if said second group of data bits and said address code do not correspond or leaving the distribution of said cable television channel frequencies unchanged if said second group of data bits and said address code correspond; and transmitting a probe signal from said head end to said service controllers for monitoring the status of each of said service controllers and for providing the cable head end with a status signal representing the operating mode of each of said service controllers.

* * * * *